United States Patent Office 3,501,420
Patented Mar. 17, 1970

3,501,420
HIGH PURITY POLYESTER DEPOLYMERIZATION PRODUCTS FROM POLYESTER SCRAP BY POLISH HYDROGENATION
George Miller Stevenson, Kingsport, Tenn., assignor to Eastman Kodak Company, Rochester, N.Y., a corporation of New Jersey
No Drawing. Filed Oct. 20, 1967, Ser. No. 676,708
Int. Cl. C08g *17/18, 53/22*
U.S. Cl. 260—2.3                              10 Claims

ABSTRACT OF THE DISCLOSURE

This invention relates to the production of high purity polyester depolymerization products from polyester scrap materials. More particularly, this invention relates to the production of substantially colorless solutions of difunctional dicarboxylic acids and difunctional glycols from dye- or other impurity-containing waste polyester, which acids and glycols may be employed in the production of high quality polyester products.

The preparation of polyesters consisting essentially of recurring groups having the structure:

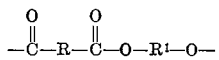

wherein R represents the radical obtained by removing the carboxyl groups from a difunctional dicarboxylic acid, and R¹ represents the radical obtained by removing the hydroxyl groups from a difunctional glycol, by esterification or ester exchange and condensation is well known. U.S. Patent 2,465,319 and many subsequently issued patents, including U.S. Patents 2,727,881 and 2,901,466, describe such processes in great detail. A common feature of these processes is that they begin with a lower dialkyl ester of a bifunctional dicarboxylic acid which is condensed with a bifunctional glycol, the glycol usually being used as such although it can be used in the form of lower alkanoic acid esters thereof, such esters being equivalents of the glycol. Such processes involve the initial preparation, in the presence of a catalyst, of a substantially monomeric compound (hereinafter designated as a "prepolymer") under conditions facilitating the removal of the lower alkanol formed from said lower dialkyl ester by ester interchange with said glycol. This is sometimes referred to as the first stage of the polyester preparation and may be conducted under a variety of conditions using many different types of apparatus.

The second stage of polyester preparation involves taking the prepolymer and causing its molecules to undergo a polymerization reaction whereby long chain polyester molecules are produced. The polymerization of the prepolymer may be by melt phase or solid phase techniques well known in the art. These techniques are illustrated in such patents as U.S. Patent 3,075,952.

The use of polyesters in film and fiber applications has increased tremendously in the past several years to the point where hundreds of millions of pounds of polyester are being produced and consumed annually. Inevitably, there is scrap polymeric material which is necessarily left over from the processing operations, rejected, or contaminated. Because large quantities are involved, it is economically unattractive to discard the scrap polymer. However, it is relatively expensive and sometimes impossible to grind up the scrap so as to place it in a usable form. In addition, the usual techniques do not provide any complete means for cleaning up the scrap polymeric material.

It has been proposed to depolymerize the scrap polyester into low molecular weight materials which can be subsequently built up to polymers having a higher inherent viscosity. However, such processes do not ordinarily produce high quality products. During the manufacture of the original polyester, a certain amount of thermal degradation is unavoidable, and this degradation produces color-forming impurities. The presence of these color-causing impurities in the scrap polyester material results in a generally inferior quality product as they have not been effectively removed by the usual physical methods such as filtration and adsorption. It has been proposed to depolymerize poly(ethylene terephthalate) scrap with a suitable catalyst and methanol at elevated temperatures. A dibasic acid ester, dimethyl terephthalate (DMT), is then recovered by a rather complex operation which requires filtration to remove insoluble impurities from the DMT and washing of the crude alcohol-wet DMT cake with alcohol. This filtration step removes most of the catalyst and glycol. However, the crude DMT cake should be atmospherically distilled to remove alcohol and refined by vacuum distillation to give a fairly pure DMT which is useful in the manufacture of polyesters. The filtrate (i.e., glycol, catalyst, and monomer) also should be separated by distillation in order to be reused. Such processes are time consuming, expensive, and inconvenient to operate.

Accordingly, it is an object of this invention to provide an improved process for the production of high purity polyester depolymerization products from polyester scrap, which products are substantially colorless.

A further object of the invention is to provide an improved process for the production of substantially colorless polyester depolymerization products from polyester scrap which may be employed without separation to produce high quality polyester products.

A still further object of the invention is to provide an improved process for the production of substantially colorless depolymerization products from polyester scrap by a simple, convenient, and relatively inexpensive method whereby the depolymerization products are purified while in the liquid phase.

Other object of this invention will appear herein.

These and other objects are attained in accordance with the present invention. It has now been found that substantially colorless depolymerization products of scrap polyester, said scrap polyester consisting essentially of recurring groups having the structure:

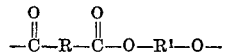

wherein R represents the radical obtained by removing carboxyl groups from a difunctional dicarboxylic acid and R¹ represents the radical obtained by removing the hydroxyl groups from a difunctional glycol, may be prepared by depolymerizing the scrap polyester in the presence of a $C_r$ to $C_{10}$ aliphatic alcohol at a temperature above 125° C. and then catalytically hydrogenating the products of the depolymerization reaction at a temperature in the range of between about 50° and about 200° C., at a pressure in the range of between about atmospheric and about 2500 pounds per square inch gauge, and for a period of time sufficient to produce a substantially colorless product.

Surprisingly, it has been found that waste or reject polyester can be treated by the process of this invention and the color attributed to the degradation history of the original polyester is effectively removed from the alcohol depolymerization reaction products of the polyester scrap. The basic raw materials of the polyester may be individually recovered, if desired. However, the substantially colorless solutions produced by the process of the present invention may be directly polymerized to the original polyester or may be blended with other materials and polymerized to a different polyester by the conventional methods previously described. The utilization of the present solutions for such polymerization processes eliminates the need for any separation and/or recovery of individual polyester precursors.

Any polyester scrap consisting essentially of recurring units defined by the above structural formula may be treated by the process of this invention. These include polyesters of reactants (A) at least one difunctional dicarboxylic acid and (B) at least one difunctional glycol. Suitable acids for preparing these polyesters are aliphatic, alicyclic, and aromatic dicarboxylic acids. Examples of such acids include oxalic; malonic; dimethylmalonic; succinic; glutaric; adipic; trimethyl adipic; pimelic; 2,2-

The polyester is first depolymerized in at least stoichiometric amounts of a $C_1$ to $C_{10}$ aliphatic alcohol, preferably a $C_2$ to $C_8$ aliphatic alcohol. Methyl, ethyl, n-propyl, n-butyl, amyl, n-hexyl, n-heptyl, and n-octyl alcohols are preferred, since they give easily handled liquid solutions which can be purified in an efficient manner. Normal propyl alcohol is especially preferred, since it is the lowest molecular weight alcohol that gives a rapid reaction without adding color to the solution other than that already present in the polyester. The equation set forth below illustrates the depolymerization reaction that occurs when using ethyl alcohol as the aliphatic alcohol with the polyester of 1,4-cyclohexanedimethanol and terephthalic acid:

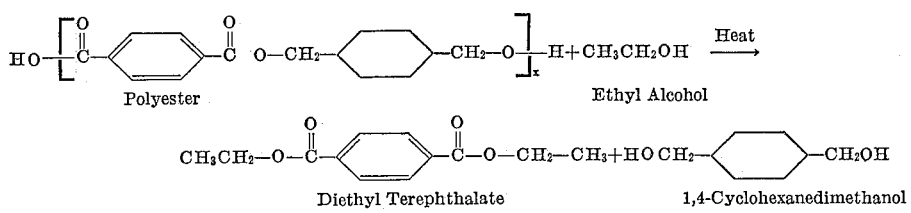

dimethylglutaric; azelaic; sebacic; suberic; fumaric; maleic; itaconic; 1,3-cyclopentanedicarboxylic; 1,2-cyclohexanedicarboxylic; 1,3-cyclohexanedicarboxylic; 1,4-cyclohexanedicarboxylic; phthalic; terephthalic; isophthalic; t-butyl isophthalic; 2,5-norbornane dicarboxylic; 1,4-naphthalic; diphenic; 4,4'-oxydibenzoic; diglycolic; thiodipropionic; 2,2,4-trimethyladipic; 4,4'-sulfonyldibenzoic; 2,5-naphthalene dicarboxylic; 2,6-naphthalene dicarboxylic; and 2,7-naphthalene dicarboxylic acids. It will be understood that the corresponding esters of these acids are included in the term "dicarboxylic acid." Examples of these esters include dimethyl-1,4-cyclohexanedicarboxylate; dimethyl-2,6-naphthalenedicarboxylate; dimethyl - 4,4' - sulfonyldibenzoate; dimethyl isophthalate; dimethyl terephthalate; and diphenyl terephthalate. Copolyesters may be prepared from two or more of the above dicarboxylic acids or esters thereof.

Suitable glycols for preparing these polyesters are aliphatic, alicyclic, and aromatic glycols. Examples of such glycols include ethylene glycol; propylene glycol; diethylene glycol; 1,2-propylene glycol; 2,4-dimethyl-2-ethylhexane-1,3-diol; 2,2,4-trimethyl-1,3-pentanediol; 2,2-dimethyl-1,3-propanediol; 2-ethyl-2-butyl-1,3-propanediol; 2,2-diethyl-1,3-propanediol; 2-methyl-2-propyl-1,3-propanediol; 2-ethyl-2-isobutyl - 1,3 - propanediol; 1,3-butanediol; 1,4-butanediol; 1,5 - pentanediol; 1,6 - hexanediol; 2,2,4 - trimethyl-1,6-hexanediol; 1,2-cyclohexanedimethanol; 1,3-cyclohexanedimethanol; 1,4-cyclohexanedimethanol; 2,2,4,4-tetramethyl-1,3-cyclobutanediol; o-, m-, and p-xylylene diols; 4,4'-sulfonyldiphenol; 4,4'-oxydiphenol; 4,4'-isopropylidenediphenol; and 2,5-naphthalenediol. Copolyesters may be prepared from two or more of the above diols.

Especially preferred polyesters are poly(ethylene terephthalate) and poly(1,4-cyclohexylenedimethylene terephthalate).

The physical form of the solid polymer to be treated is not critical. Thus, fibers, films, powder, pellets, molded pieces, and chunks may be effectively treated by the process of this invention. However, the depolymerization product may be filtered while in solution to remove pigment and other insoluble impurities if, for example, the source of polyester scrap material is pigmented yarn. Likewise, the depolymerization product may be treated with a solid adsorbent, such as activated carbon, for removal of certain impurities including colored catalyst complexes. Thus, the treatment to be accorded the depolymerization product will depend upon the nature of the particular polyester scrap which is utilized.

A catalyst may be employed in the depolymerization reaction, if desired, although a catalyst is not absolutely necessary for the practice of the invention. Suitable catalysts include those catalysts which may be used in the preparation of the polyester including organic and inorganic compounds of metals such as titanium, manganese, antimony, zinc, tin, lead, calcium, cobalt, lithium, and combinations thereof. The prior art, for example, discloses a great number of such catalysts, some of which are described in patents such as U.S. 2,465,319; U.S. 2,720,502; U.S. 2,727,881; and others. Specific catalysts which may be utilized include titanium isopropoxide, sodium methoxide, magnesium acetate, manganese acetate, tetraisopropyl titanate, titanium dioxide, zinc acetate, zinc acetyl acetonate, lead oxide, calcium oxide, lithium ethoxide, antimony trioxide, and manganese oxides. Generally, the acetates, chlorides, nitrates, sulfates, oxides, and alkoxides of one or more of zinc, manganese, tin, lead, titanium, antimony, cobalt and lithium are preferred. However, the most preferred catalysts are those which are compatible with the original catalyst used in making the polyester.

The catalyst is generally utilized in a concentration of from about 0.001 percent to about 0.2 percent by weight of the reactants. Higher or lower percentages may also be employed. Generally from about 0.005 percent to about 0.05 percent catalyst based upon the reactants may be advantageously employed. The temperature employed in the depolymerization reaction should be at least about 125° C. at the vapor pressure of the alcohol. Suitable temperatures include those within the range of between about 125° C. and about 250° C., preferably between about 150° C. and about 200° C. The contact time may be varied over a wide range. Suitable contact times include from about one to about five hours, preferably between about two and about four hours.

As previously mentioned, the amount of alcohol that is employed in the reaction is preferably in excess of the stoichiometric quantity required for reaction. The preferred amount of alcohol is from about two to about three parts by weight of the alcohol to one part by weight polymer. The employment of a stoichiometric excess of alcohol permits more rapid reaction rates and a greater ease in handling. Thus, if the polymer contains insoluble impurities, the depolymerization products may be easily filtered at room temperature if desired, since the reacted polyester scrap material is completely in solution. If a minimum amount of alcohol is used in the depolymerization reaction, the residual low molecular weight polymer tend to precipitate at low temperatures. However, only slight heating is required to cause the precipitate to go back into solution. The use of a large excess of alcohol makes for a low viscosity solution at low temperatures.

The solution containing the depolymerization product is colored due at least in part to the thermal degradation products that were present in the crude polyester. The degree of coloration is proportional to the amount of thermal degradation and/or mechanical processing which the crude polyester had undergone. Any pigment or other insoluble impurities may be removed by filtration.

After filtration, the soluiton may be treated with a solid adsorbent (such as activated carbon) for removal of any adsorbable colored complexes including metal catalyst complexes. The filtration treatment removes most of the catalyst residue, and a clear and transparent solution results. However, the color-causing impurity content of the solution may still be of such a magnitude as to render it unfit for utilization where a high quality product is required.

In order to produce a substantially colorless, high purity solution of polyester depolymerization products, the solution is subjected to polish hydrogenation. The polish hydrogenation step is required for the purpose of eliminating residual color from the solution, such as that which is produced by olefinic, color-causing compounds. However, at the same time, it is necessary that the aromatic ring portion of any aromatic structure which may be present not be hydrogenated to any degree. The "polish" hydrogenation may be termed a selective hydrogenation reaction which is conducted under conditions such that unsaturated color-forming impurities are hydrogenated, but the main product is not hydrogenated. The unsaturated color-forming compounds are hydrogenated and rendered colorless. The aforesaid filtering and adsorptive treatments are incapable of removing these color-causing compounds to the necessary extent.

The polish hydrogenation reaction is, therefore, conducted under conditions which favor hydrogenation only of the unsaturated impurities. Suitable temperatures include those in the range of between about 50° and 200° C., preferably between about 100° and about 150° C. Suitable pressures include those in the range of between about atmospheric and about 2,500 p.s.i.g., preferably between about 1,000 and about 2,000 p.s.i.g. Contact times may be in the range of between about one and about six hours. The processing conditions are interdependent. Thus, if a lower temperature is selected, a higher pressure and longer contact time are required for effective removal of the color-causing impurities.

The catalyst employed in the hydrogentaion reaction must be selective and must not promote hydrogenation of the desired product at the selected conditions. Suitable catalysts include palladium, platinum, and ruthenium. Although the catalyst need not be provided with a support, useful supports for these catalysts include the various inert materials, such as carbon, kieselguhr, and alumina. A preferred supported catalyst is palladium on activated carbon.

Suitable amounts of the catalyst include between about 0.1 and 10 percent by weight catalyst on the support, preferably between about one and about five percent by weight catalyst. Larger amounts of catalyst may be employed.

The hydrogenation reaction and the depolymerization reaction may be conducted in any suitable apparatus which is conventional for such purposes. These processes may be conducted in either a batch or a continuous operation. For example, the commercially available types of steel or stainless steel autoclaves commonly used for high pressure catalytic hydrogenation reactions may be employed. In addition, it is desirable that the autoclave be provided with an efficient agitator for improved reactant contact and heat distribution. However, agitation is not essential to the success of this invention.

The process of this invention permits the production of a solution comprising a diester of an aroamtic dicarboxylic acid and an aliphatic or cyclic glycol having an APHA solution color as low as in the range of about 5 to 15 pcs. Accordingly, the present process provides a means of recovering high purity polyester precursor materials from scrap polyester in an efficient and relatively inexpensive operation. In addition, this invention provides solutions that may be directly polymerized to produce high molecular weight polyesters of a high quality that may be employed for casting films and coatings, including ultra-thin films and coatings, spinning fibers, and the like.

This invention will be further illustrated by the following examples of preferred embodiments, although it will be understood that these examples are included merely for purposes for illustration and are not intended to limit the scope of the invention.

EXAMPLE 1

One thousand fifty-five (1,055) grams of poly(1,4-cyclohexylenedimethylene terephthalate) cabinet waste, 3,000 grams of n-propyl alcohol, and 20 drops of titanium isopropoxide catalyst are charged to a stirred autoclave. The mixture is heated to 185° C. and held for two hours under the vapor pressure of n-propyl alcohol which is 155 p.s.i.g. The mixture is then cooled, discharged, and filtered. Approximately 50 grams of Nuchar are added and stirred in for about one hour at a temperature of about 70° C. The material is filtered again and analyzed to have an APHA [1] color of 80 pcs.

Next, 1,500 grams of the resulting solution and 30 grams of one percent by weight palladium on carbon are charged to a stirred autoclave. The mixture is heated to a temperature of 150° C. while under 1,800 p.s.i.g. hydrogen for a period of four hours. After cooling, discharging, and filtering, the solution has the product distribution indicated below.

| Gas chromatography analysis: | Percent |
|---|---|
| Dipropylterephthalate | 17.6 |
| 1,4-cyclohexanedimethanol | 11.2 |
| n-Propanol | 71.2 |

This solution has an APHA color of 15 pcs. This sample is polymerized to yield a polyester of good color, inherent viscosity, and having many desirable properties.

EXAMPLE 2

Five hundred (500) grams of poly(1,4-cyclohexylenedimethylene terephthalate) heat-set and drawn yarn, 875 grams of ethyl alcohol, and 10 drops of titanium isopropoxide catalyst are charged to a stirred autoclave and reacted at 180° C. for two hours. The material is then filtered and treated with activated carbon to give an APHA color of 100 pcs.

Next, the solution is subjected to polish hydrogenation at a temperature of 100° C. employing 1,800 p.s.i.g. hydrogen over the palladium on carbon catalyst of the previous example. The hydrogenation treatment is continued for a period of four hours. The product is cooled, filtered, and has the following analysis:

| Gas chromatography analysis: | Percent |
|---|---|
| Diethyl terephthalate | 18.8 |
| 1,4-cyclohexanedimethanol | 9.7 |
| Ethyl alcohol | 68.0 |
| Polymer | 3.5 |

The filtered hydrogenation product has an APHA color of 15 pcs. and yields a polyester of good quality when polymerized.

The following example illustrates the process of this invention employing scrap poly(ethylene terephthalate).

---

[1] The APHA color values that are used in the examples are based upon a standard platinum-cobalt solution reference color as described in ASTM–D–1209.

EXAMPLE 3

Five hundred (500) grams of poly(ethylene terephthalate) heat-set and drawn yarn, 875 grams of n-propyl alcohol, and 10 drops of titanium isopropoxide catalyst are charged to a stirred autoclave and reacted at 180° C. for a period of three hours. The material is then filtered and treated with activated carbon. Upon analysis, this product yields an APHA color value of 70 pcs.

Next, the adsorbent treated solution is subjected to polish hydrogenation for a period of four hours at a temperature of 150° C., while under 1,800 p.s.i.g. hydrogen pressure employing a palladium on carbon catalyst similar to that previously employed. The product is cooled, filtered, and has the following analysis:

| Gas chromatography analysis: | Percent |
| --- | --- |
| Di-n-propyl terephthalate | 36.0 |
| Ethylene glycol | 7.1 |
| n-Propyl alcohol | 52.2 |
| Polymer | 4.7 |

A color analysis of this product indicates that the APHA color is lowered to 10 pcs. The solution is subjected to polymerization and yields a poly(ethylene terephthalate) product having very desirable color, inherent viscosity, and melting point characteristics.

The following example illustrates the process of this invention in the absence of any solid adsorptive treatment.

EXAMPLE 4

Five hundred (500) grams of poly(1,4-cyclohexylenedimethylene terephthalate) pellets, 875 grams of n-butyl alcohol, and 10 drops of titanium isopropoxide catalyst are charged to a stirred autoclave and reacted at 180° C. for 2½ hours. The reaction mixture is cooled, filtered, and subjected to hydrogenation at 100° C., 1,700 p.s.i.g. hydrogen pressure, over a palladium on carbon catalyst for four hours. The product is cooled and filtered.

This product yields the following analysis:

| Gas chromatography analysis: | Product |
| --- | --- |
| Di-n-butyl terephthalate (pct.) | 40.0 |
| 1,4-cyclohexanedimethanol (pct.) | 10.0 |
| n-Butyl alcohol (pct.) | 51.4 |
| Absorbance at 350 millimicrons | 0.128 |
| Absorbance at 800 millimicrons | 0.020 |

The hydrogenated product is polymerized and yields a polyester having good color, inherent viscosity, and melting point characteristics.

The invention has been described in detail with particular reference to preferred embodiments thereof, but it will be understood that variations and modifications can be effected within the spirit and scope of the invention as described hereinabove and as defined in the appended claims.

I claim:

1. A process for the production of a substantially colorless depolymerization product of scrap polyester, said scrap polyester consisting essentially of recurring groups having the structure:

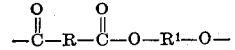

wherein R represents the radical obtained by removing the carboxyl groups from a difunctional dicarboxylic acid and $R^1$ represents the radical obtained by removing the hydroxyl groups from a difunctional glycol, which process comprises reacting said scrap polyester with a $C_1$ to $C_{10}$ aliphatic alcohol at a temperature above 125° C. so as to obtain a depolymerized reaction product, and then catalytically hydrogenating said product at a temperature in the range of between about 50° C. and about 200° C. at a pressure in the range of between about atmospheric and about 2,500 pounds per square inch gauge, and for a time sufficient to produce a substantially colorless product.

2. A process as defined by claim 1 wherein the temperature of hydrogenation is between about 100° C. and about 150° C., the pressure is between about 1,000 and about 2,000 pounds per square inch gauge, and the contact time is between about one and about six hours.

3. A process as defined by claim 1 wherein the hydrogenation catalyst is palladium.

4. A process as defined by claim 1 wherein the scrap polyester is formed by the reaction of an aliphatic diester of an aromatic dicarboxylic acid and a glycol selected from the group consisting of aliphatic and cyclic glycols.

5. A process as defined by claim 1 wherein the scrap polyester is poly(ethylene terephthalate).

6. A process as defined by claim 1 wherein the scrap polyester is poly(1,4-cyclohexylenedimethylene terephthalate).

7. A process as defined by claim 1 wherein the depolymerized reaction product is treated with a solid adsorbent prior to hydrogenation.

8. A process as defined by claim 7 wherein the solid adsorbent is activated carbon.

9. A process as defined by claim 1 wherein the alcohol employed in the depolymerization reaction is a $C_2$ to $C_8$ aliphatic alcohol.

10. A process as defined by claim 9 wherein the alcohol is n-propanol.

References Cited
UNITED STATES PATENTS

| | | | |
| --- | --- | --- | --- |
| 3,264,255 | 8/1966 | Taylor | 260—75 |
| 3,403,115 | 9/1968 | Gruschke et al. | 260—2.3 |

MURRAY TILLMAN, Primary Examiner

M. J. TULLY, Assistant Examiner

U.S. Cl. X.R.

260—75